3,308,104
CRYSTALLINE COPOLYMERS OF AN ALPHA-OLEFIN AND AROMATIC ALKENYL THIOETHER
Manfred Feldhoff, Oberseelbach, Taunus, Albert Gustav Martin Gumboldt, Frankfurt am Main, and Jürgen Helberg, Kelkheim, Taunus, Germany, assignors to Hercules Powder Company, Wilmington, Del., a corporation of Delaware
No Drawing. Filed Oct. 29, 1964, Ser. No. 407,570
Claims priority, application Germany, Nov. 28, 1963, F 41,410
9 Claims. (Cl. 260—79.7)

The present invention relates to new and useful copolymers of an α-olefin and an unsaturated thioether.

It is known that it is possible to convert α-olefins with organometallic mixed catalysts, which have become known in industry as "Ziegler catalysts," at low pressure and low temperatures into high molecular weight polymers and copolymers.

According to the invention it has been found that crystalline copolymers with valuable properties can be prepared by copolymerizing by the known low-pressure process α-olefins of the general formula $CH_2=CH-R$, where R represents hydrogen or an alkyl, aryl, or alkaryl radical with an unsaturated thioether of the general formula

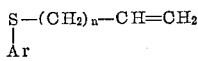

in which $n$ is a numeral from 0 to 12, preferably from 1 to 12, and Ar represents an aromatic radical. The aromatic radical can be unsubstituted or substituted singly or multiply by an alkyl, cycloalkyl, aryl, alkoxy, aryloxy, halogen, or dialkylamino group.

This finding is surprising, since it had been established that corresponding α-alkylene thioethers, e.g., alkylvinyl thioether, alkylallyl thioether, and the like, cannot be copolymerized with α-olefins but strongly inhibit α-olefin polymerization and even stop the polymerization completely, i.e., they damage or destroy the organometallic catalyst system.

α-Olefins of the general formula $CH_2=CHR$, where R represents hydrogen or an alkyl, aryl, or alkaryl radical of 2 to 15 carbon atoms, are suitable for copolymerization with the above-mentioned thioethers. Examples of such olefins are ethylene, propylene, butene-1, 3-methylbutene-1, pentene-1, 4-phenylpentene-1, 4-phenylbutene-1, 5-phenylpentene-1, hexene-1, and styrene.

Preferred thioethers with which the α-olefins can be copolymerized are β-naphthylbutene(3)yl thioether, β-naphthylpentene(4)yl thioether, β-naphthylundecene(10)yl thioether, phenylbutene(3)yl thioether, phenylpentene-(4)yl thioether, phenylundecene(10)yl thioether, p-dimethylaminophenylpentenyl thioether, p-methylphenylundecene(10)yl thioether, p-chlorophenylbutene(3)yl thioether, and 3-(4-diphenyl sulfide)-propene-1. The copolymers can, of course, comprise more than one α-olefin and more than one thioether as desired.

The copolymers prepared according to the invention have a definite crystal melting point and contain 99 to 70%, preferably 99 to 85%, by weight of α-olefin and correspondingly 1 to 30%, preferably 1 to 15%, by weight of the unsaturated thioether. They distinguish themselves by a very high resistance to thermal and oxidative degradation and can be dyed with dispersion dyes more readily than the homopolymer of the α-olefin. The copolymers have melting points, densities, and other physical properties very similar to those of the homopolymers of the olefin, and are useful in the same applications as the homopolymers.

The resistance to thermal and oxidative degradation is so outstanding that they may be considered as "high molecular weight stabilizers." In fact, the copolymers can serve as stabilizers for the homopolyolefins. Compared with polypropylene stabilized with low molecular weight compounds, the new copolymers have the advantage of not suffering from migration or extraction of stabilizers.

The catalysts suitable according to the process of the invention for the preparation of copolymers are the same as already known for the low-pressure polymerization of α-olefins, i.e., organometallic mixed catalysts. Combinations of titanium trichloride with $Al(C_2H_5)_3$,

or $Al_2(C_2H_5)_3Cl_3$ are particularly advantageous. A suitable catalyst system is prepared by mixing 0.1 to 20 parts, preferably 2 to 4 parts, by weight of the organoaluminum compound with one part of titanium chloride in an inert liquid diluent, e.g., an aliphatic hydrocarbon. It is possible to use titanium chloride which has been obtained from $TiCl_4$ by reduction with hydrogen or with aluminum or with an organoaluminum compound.

The copolymerization of the α-olefin and unsaturated thioether can be carried out via known techniques as a block copolymerization or as an ordinary random copolymerization, preferably in an inert liquid diluent, by adding the monomer once or several times, separately one after another or together to a dispersion of the catalyst components in an aliphatic, alicyclic or aromatic hydrocarbon, e.g., n-heptane, n-hexane, cyclohexane, cyclopentane, toluene, chlorobenzene, anisol, or well-purified mineral oil fractions, and the like. However, the polymerization can also be carried out in the mixtures of the monomers themselves without any diluent.

The polymerization is desirably carried out at temperatures between 30 and 150° C., preferably at 40 to 80° C. One can polymerize at normal atmospheric pressure or a slightly elevated pressure, preferably at about 1 to 10 atmospheres. The duration of the polymerization is desirably about 0.5 to 15 hours, preferably 2 to 8 hours. The polymerization can be interrupted by addition of an alcohol, e.g., isopropanol or n-butanol, or of a ketone, e.g. acetone. After washing with water, the powdery polymer is filtered off, washed several times with benzene, methanol, and acetone and finally dried. Alternatively, the diluent can be removed in known manner by steam distillation instead of by washing.

The copolymers obtained according to the process of the invention can be processed into molded articles by the methods commonly used for olefin polymers.

The following examples will illustrate the present invention without, however, limiting it.

EXAMPLE 1

(a) Preparation of TiCl₃ catalyst component

Ethylaluminum sesquichloride (400 mmoles) and 200 mmoles of triethylaluminum are dissolved in 300 ml. of a paraffinic petroleum fraction having a boiling range 180–200° C. which had been sparged with purer nitrogen and freed from water, oxygen, sulfur, and olefins. At 0° C., 109.6 ml. (1000 mmoles) of titanium tetrachloride is added dropwise in 30 minutes. The deep red dispersion obtained is stirred at 0° C. for 3 additional hours and subsequently, with further stirring, tempered at 100° C. for 5 hours. The TiCl₃-containing precipitate formed is diluted with 300 ml. of the same petroleum fraction.

(b) Copolymerization of phenylpentene(4)yl thioether with propylene

Triethylaluminum (15 mmoles) and 20 mmoles of TiCl₃ in the form of the catalyst component described under 1(a) are added under nitrogen into 2 l. of a petroleum fraction having a boiling range of 180–200° C. and the whole is heated with stirring to 50° C. Then 50 mmoles of phenylpentenyl thioether is added to the dispersion and thereafter propylene is introduced into the dispersion at a rate about 10% higher than the rate at which it is consumed. The quantity of propylene introduced is measured via a rotameter and about 10% of off gas is produced. The temperature of the polymerization vessel is maintained at 50° C. After 5 hours the polymerization is stopped by addition of 50 ml. of n-butanol. The resulting polymer slurry is stirred for 30 minutes at 50° C. and washed five times with 500 ml. of warm, oxygen-free water of 50° C. The polymer is separated by filtration, washed three times with n-hexane, five times each with methanol and acetone, and finally dried at 70° C. under vacuum. Seventy-one (71) g. of a crystalline polymer powder, M.P. 161.5° C., and a reduced specific viscosity ($\eta$ spec./c-value) of 6.82 (measured in 0.1% solution of decahydronaphthalene at 135° C.) is obtained. By distilling off the mother liquor, 12 g. of amorphous and oily polymer is isolated. The space-time yield is 8.3 g./l. hr., 85.5% of the polymer being crystalline.

Details of the polymerization and properties of the copolymers are given in the table.

EXAMPLE 2

*(a) Preparation of catalyst*

Ethylaluminum sesquichloride (2.2 moles) is dissolved in 1.5 l. of a paraffinic petroleum fraction, boiling range 180–200° C., which had been rinsed with pure nitrogen and freed from water, oxygen, sulfur, and olefins, and a solution of 2 moles of titanium tetrachloride in 300 ml. of the petroleum fraction is added dropwise within 3 hours at 0° C. The deep red dispersion formed is stirred 2 additional hours at 0° C. and heated with further stirring for 5 hours to 110° C. After cooling to room temperature the resulting $TiCl_3$-containing precipitate is allowed to settle and the supernatant clear solution is siphoned off. The catalyst is washed about 10 times with stirring with the above-described petroleum fraction and the diluent is removed each time by siphoning off.

*(b) Copolymerization of β-naphthylundecene(10)yl thioether with propylene*

Diethylaluminum monochloride (40 mmoles) is added under nitrogen to 2 l. of the above-mentioned petroleum fraction heated to 50° C. Then 50 mmoles of β-naphthylundecene(10)yl thioether is added to the solution and after another 10 minutes 20 mmoles of $TiCl_3$ in the form of the catalyst component described under 2(a) is added. Next, propylene is introduced for 5 hours at a rate about 10% higher than the rate at which it is consumed.

Further treatment is as in Example 1(b). One hundred and thirty-six (136) g. of a crystalline polymer powder, M.P. 164.5° C., and having a reduced specific viscosity of 7.31 (measured in 0.1% solution of decahydronaphthalene at 135° C.) is obtained. Twenty (20) g. of amorphous and oily polymer is isolated by distilling off the mother liquor. The space-time yield is 15.6 g./l. hr., 87.2% of the polymer being crystalline.

EXAMPLE 3

Diethylaluminum monochloride (40 mmoles) is added under nitrogen to 2 l. of the above-mentioned petroleum fraction heated to 50° C. Then 20 mmoles $TiCl_3$ in the form of the catalyst described under 2(a) is added, whereupon for 30 minutes propylene is introduced at a rate about 10% higher than the rate at which it is consumed. Then the propylene supply is stopped and nitrogen introduced until all unreacted propylene is removed from the polymerization vessel (about 10 minutes). Then 50 mmoles of phenylbutene(3)yl thioether is added under nitrogen atmosphere and maintained under nitrogen for 1 hour. The nitrogen supply is then stopped and propylene again introduced for half an hour. The propylene is again driven out by nitrogen, 50 mmoles of phenylbutene (3)yl thioether is again added, kept for 1 hour under nitrogen, and the polymerization then continued for an additional 2 hours, during which time propylene is introduced at such a rate that about 10% escapes as waste gas. The finishing steps of the polymerization are the same as under 1(b). A crystalline polymer powder, M.P. 164° C., and reduced specific viscosity 4.87 (measured in 0.1% solution of decahydronaphthalene) is obtained in an amount of 60.3 g. The space-time yield is 6.85 g./l. hr., 87.6% thereof the crystalline modification. From the mother liquor 8.2 g. of amorphous and low-molecular, oily polymers are obtained.

EXAMPLE 4

Diethylaluminum monochloride (40 mmoles) is added under nitrogen to 2 l. of the above-mentioned petroleum fraction, heated to 50° C. Then 50 mmoles of phenylpentene(4)yl thioether and after another 10 minutes 20 mmoles of $TiCl_3$ in the form of the catalyst component described under 2(a) are added to the solution. Subsequently 15 l./hr. of ethylene and 10 l./hr. of nitrogen are introduced for 5 hours. Further treatment is the same as under 1(b). Ninety-nine (99) g. of a crystalline polymer powder, M.P. 127° C., reduced specific viscosity 13.72, is obtained. The space-time yield is 9.9 g./l. hr. The polymer has a density of 0.9025 g./cc. and contains 1.4% by weight of phenylpentenyl thioether. It is characterized by high thermal and oxidative stability in comparison to homopolyethylene.

EXAMPLES 5–8

The copolymerization of propylene with other thioethers is carried out according to Example 2 and the finishing steps according to Example 1(b). Details of the polymerization and the properties of the copolymers are summarized in the table.

TABLE

COPOLYMERIZATION OF UNSATURATED THIOETHERS AND PROPYLENE AT 50° C.

| Ex. | Type of Copolymerization | Propylene Supply | α-Alkylenearyl Thioether | Mmoles | Crystalline Polymer, g. | Crystalline Polymer as Percent of Total Polymer | Percent by Wt. of Thioether in Crystalline Polymer [1] | Reduced Specific Viscosity | Density, g./cc. | Crystalline M.P., °C. |
|---|---|---|---|---|---|---|---|---|---|---|
| 1 | Random | Excess | Phenylpentenyl thioether | 50 | 71 | 85.5 | 2.5 | 6.82 | 0.9178 | 161.5 |
| 2 | do | do | β-Naphthylundecenyl thioether | 50 | 136 | 87.2 | 2.4 | 7.31 | 0.9112 | 164.5 |
| 3 | Block | do | Phenylbutenyl thioether | 100 | 60.3 | 87.6 | 1.2 | 4.87 | 0.9111 | 164 |
| 5 | Random | Insufficient | Naphthylundecenyl thioether | 50 | 85 | 84.2 | 3.5 | 5.80 | 0.9142 | 162.5 |
| 6 | do | do | do | 100 | 51 | 87 | 12.4 | 5.20 | 0.9131 | 164 |
| 7 | do | Excess | Phenylpentenyl thioether | 50 | 69 | 97.9 | 1.45 | 6.97 | 0.9178 | 162 |
| 8 | do | do | do | 100 | 51 | 88.7 | 3.3 | 6.54 | 0.9122 | 163.5 |

[1] The determination of the percent by weight of the alkylenearyl thioether in the copolymer was carried out with the help of IR-spectroscopy and elementary analysis. The products were always dissolved and reprecipitated three times from xylene and after each of these operations extracted in a Soxhlet extractor with $CCl_4$ for 10 hours.

The copolymers described in the foregoing table exhibit excellent heat stability without the addition of stabilizers, which is most remarkable considering the notoriously poor heat stability of crystalline polypropylene without added stabilizers. Unstabilized polypropylene, for example, becomes brittle in less than 24 hours when exposed to circulating air at 133° C. whereas the propylene copolymers described in the examples do not become embrittled after exposure of more than 360 hours under the same conditions.

What we claim and desire to protect by Letters Patent is:

1. Crystalline copolymers of an α-olefin selected from the group consisting of ethylene and propylene with an unsaturated thioether of the general formula

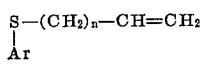

in which $n$ is a number from 0 to 12 and Ar is an aromatic radical, said copolymers having a definite crystalline melting point and being comprised of 99 to 70% by weight of α-olefin and 1 to 30% by weight of unsaturated thioether.

2. The copolymer of claim 1 in which the α-olefin is propylene.

3. The copolymer of claim 1 in which the α-olefin is ethylene.

4. The copolymer of claim 1 in which the unsaturated ether is phenylpentene(4)yl thioether.

5. The copolymer of claim 1 in which the unsaturated ether is β-naphthylpentene(4)yl thioether.

6. The copolymer of claim 1 in which the unsaturated ether is β-naphthylundecene(10)yl thioether.

7. The copolymer of claim 1 in which the unsaturated ether is phenylbutene(3)yl thioether.

8. The copolymer of claim 1 in the form of a block copolymer.

9. The copolymer of claim 1 in the form of a random copolymer.

References Cited by the Examiner

UNITED STATES PATENTS

| | | | |
|---|---|---|---|
| 2,467,234 | 4/1949 | Sargent et al. | 260—79.7 |
| 2,877,214 | 3/1959 | Opheim et al. | 260—79.7 |
| 3,070,577 | 12/1962 | Stogryn et al. | 260—62 |

JOSEPH L. SCHOFER, *Primary Examiner.*

W. HOOVER, *Assistant Examiner.*